United States Patent
Ding et al.

(10) Patent No.: US 7,596,795 B2
(45) Date of Patent: Sep. 29, 2009

(54) VIBRATION COMPENSATION BASED ON IDENTIFICATION OF VIBRATION FREQUENCY

(75) Inventors: Mingzhong Ding, Singapore (SG); KianKeong Ooi, Singapore (SG); KeXiu Liu, Singapore (SG); YiLei Wu, Singapore (SG); ShuYu Cao, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 200 days.

(21) Appl. No.: 11/736,179

(22) Filed: Apr. 17, 2007

(65) Prior Publication Data

US 2008/0262658 A1 Oct. 23, 2008

(51) Int. Cl.
*G11B 33/14* (2006.01)
*G11B 33/08* (2006.01)
*G05B 21/00* (2006.01)
*G05B 13/00* (2006.01)
*G05B 15/00* (2006.01)
*G01M 1/38* (2006.01)
*G05D 23/00* (2006.01)
*G05B 11/01* (2006.01)
*G11B 17/00* (2006.01)
*G11B 21/16* (2006.01)

(52) U.S. Cl. .................. 720/651; 700/280; 318/560; 369/247.1

(58) Field of Classification Search ............... 700/780; 702/54, 56; 720/648, 651, 688, 692; 318/560; 360/31, 69, 75, 77.02, 78.09; 369/44.29, 369/247.1, 263.1; 381/71.1, 71.2

See application file for complete search history.

(56) References Cited

U.S. PATENT DOCUMENTS

| | | | | |
|---|---|---|---|---|
| 4,910,449 A | * | 3/1990 | Hiyama et al. | 318/640 |
| 4,929,874 A | * | 5/1990 | Mizuno et al. | 318/128 |
| 5,266,924 A | | 11/1993 | Chung | |
| 5,425,436 A | * | 6/1995 | Teramura et al. | 188/280 |
| 5,426,545 A | * | 6/1995 | Sidman et al. | 360/78.09 |
| 5,452,276 A | * | 9/1995 | Baas | 369/44.29 |
| 5,521,772 A | | 5/1996 | Lee et al. | |
| 5,585,566 A | | 12/1996 | Welles, II et al. | |
| 5,789,713 A | * | 8/1998 | Wakasa et al. | 177/25.13 |
| 5,923,487 A | | 7/1999 | Carlson et al. | |
| 6,018,431 A | | 1/2000 | Carlson et al. | |
| 6,310,746 B1 | | 10/2001 | Hawwa et al. | |
| 6,510,014 B2 | | 1/2003 | Kikuta et al. | |
| 6,542,181 B1 | * | 4/2003 | Houska et al. | 348/144 |
| 6,549,349 B2 | | 4/2003 | Sri-Jayantha et al. | |
| 6,593,855 B2 | | 7/2003 | Fujino et al. | |
| 6,614,613 B1 | | 9/2003 | Huang et al. | |
| 6,801,864 B2 | * | 10/2004 | Miller | 702/56 |

(Continued)

FOREIGN PATENT DOCUMENTS

JP   10185673 A  *  7/1998

(Continued)

*Primary Examiner*—Crystal J Barnes-Bullock
(74) *Attorney, Agent, or Firm*—Leanne Taveggia Farrell; Westman, Champlin & Kelly ,P.A.

(57) ABSTRACT

A shock detection circuit housed in an electronic device includes an output shock signal that is indicative of vibration amplitude. To compensate for vibrations that are experienced by the electronic device, the output shock signal is analyzed. The analysis of the output shock signal allows a vibration frequency of the output shock signal to be identified and used in vibration compensation.

12 Claims, 9 Drawing Sheets

U.S. PATENT DOCUMENTS

| | | |
|---|---|---|
| 6,999,260 B2 | 2/2006 | Abe et al. |
| 7,016,744 B2 * | 3/2006 | Howard et al. ................. 700/83 |
| 7,154,690 B1 | 12/2006 | Brunnett et al. |
| 7,319,570 B2 * | 1/2008 | Jia et al. .................. 360/77.02 |
| 7,386,395 B1 * | 6/2008 | Masson ...................... 701/220 |
| 7,481,400 B2 * | 1/2009 | Appleby et al. ............. 246/249 |
| 7,561,365 B2 * | 7/2009 | Noguchi et al. ............... 360/75 |
| 2001/0036026 A1 * | 11/2001 | Chen et al. .................... 360/31 |
| 2003/0103287 A1 * | 6/2003 | Agematsu .................... 360/60 |

FOREIGN PATENT DOCUMENTS

| | | | |
|---|---|---|---|
| SU | 813265 B | * | 3/1981 |
| SU | 1059322 A | * | 12/1983 |

* cited by examiner

VIBRATION COMPENSATION BASED ON IDENTIFICATION OF VIBRATION FREQUENCY

BACKGROUND

The present disclosure relates generally to vibration compensation in an electronic component, and more specifically, but not by limitation, to vibration compensation for periodic vibrations coupled through a system housing the electronic component.

Electronic devices, especially portable electronic devices, often include both audio and video capabilities, which require high capacity data storage systems. As demand for electronic devices, especially electronic portable devices, increases so does the demand for high capacity, small sized and low cost data storage systems. Unlike solid-state data storage devices, rotatable data storage devices provide a higher storage capacity. However, rotatable data storage devices are more susceptible to failure due to sources of vibration or shock.

In particular, rotatable data storage devices are sensitive to vibrations emanating from the electronic portable device within which it is housed. Example sources of vibration include a vibrator in a mobile phone and audio speakers in other types of electronic devices. When the vibrator or speaker is activated, the rotatable data storage device is induced with disturbances that cause position error of a data head relative to the rotatable medium in the rotatable storage device.

Typically, high end rotatable data storage devices use either expensive rotational vibration sensors or linear vibration sensors that can directly sense the vibration amplitude of a shock event. The sensed vibration amplitude can be processed and forwarded directly into a servo controller, which positions the data head relative to the rotatable medium of the high end rotatable storage device. By injecting the vibration amplitude directly into the servo controller, vibrations from the shock event can be compensated. Unfortunately, high end rotatable data storage devices are impractical for use in inexpensive electronic portable devices.

Current low cost rotatable data storage devices are equipped with inexpensive shock detection circuits for the purpose of write protection. The output of these inexpensive shock detection circuits cannot be used directly in a servo controller for vibration compensation. Instead, the outputs of these inexpensive shock detection circuits can only indicate a level of vibration amplitude. If the amplitude level exceeds a threshold level, the shock detection circuit outputs a trigger signal capable of preventing a write operation.

Since shock events in electronic devices, especially in electronic portable devices, are very common, preventing a write operation for each occurrence of a shock event compromises read/write data throughput of the rotatable data storage device. Therefore, utilizing an inexpensive shock detection circuit for vibration compensation in an electronic portable device is highly desirable.

SUMMARY

A shock detection circuit housed in an electronic device includes an output shock signal that is indicative of vibration amplitude. To compensate for vibrations that are experienced by the electronic device, the output shock signal is analyzed. The analysis of the output shock signal allows a vibration frequency of the output shock signal to be identified and used in vibration compensation.

A method is provided. An output shock signal is obtained from a shock detection circuit. The output shock signal is indicative of vibration amplitude. The output shock signal is analyzed by applying a sampling technique to the output shock signal. A vibration frequency of the output shock signal is identified based on the analyzed output shock signal. The identified vibration frequency is configured for use in vibration compensation.

An electronic component is provided. The electronic component includes a shock detection circuit configured to output an output signal. The output signal is indicative of vibration amplitude. The electronic component includes a first controller that is configured to receive the output signal and to identify a vibration frequency of the vibration based on the output signal. The rotatable data storage device also includes a second controller that is configured to receive the identified frequency of the vibration and to compensate the vibration.

DETAILED DESCRIPTION OF ILLUSTRATIVE EMBODIMENTS

Electronic devices, such as phones, video recorders, video players, computing systems, stereo systems, media systems and automotive systems, include sources of vibration. Such sources of vibration expose electronic components within the electronic devices with undesirable shock and vibrations. In particular, electronic components in electronic portable devices, such as mobile phones, digital music players, personal data assistants (PDAs) and camcorders, are highly susceptible to not only vibrations derived from the device itself, but also vibrations due to moving and dropping the device. One sensitive type of electronic component in an electronic device includes a data storage system. Electronic portable devices that include audio and video capability often times include either solid-state storage devices or rotatable storage devices.

Figure 1:
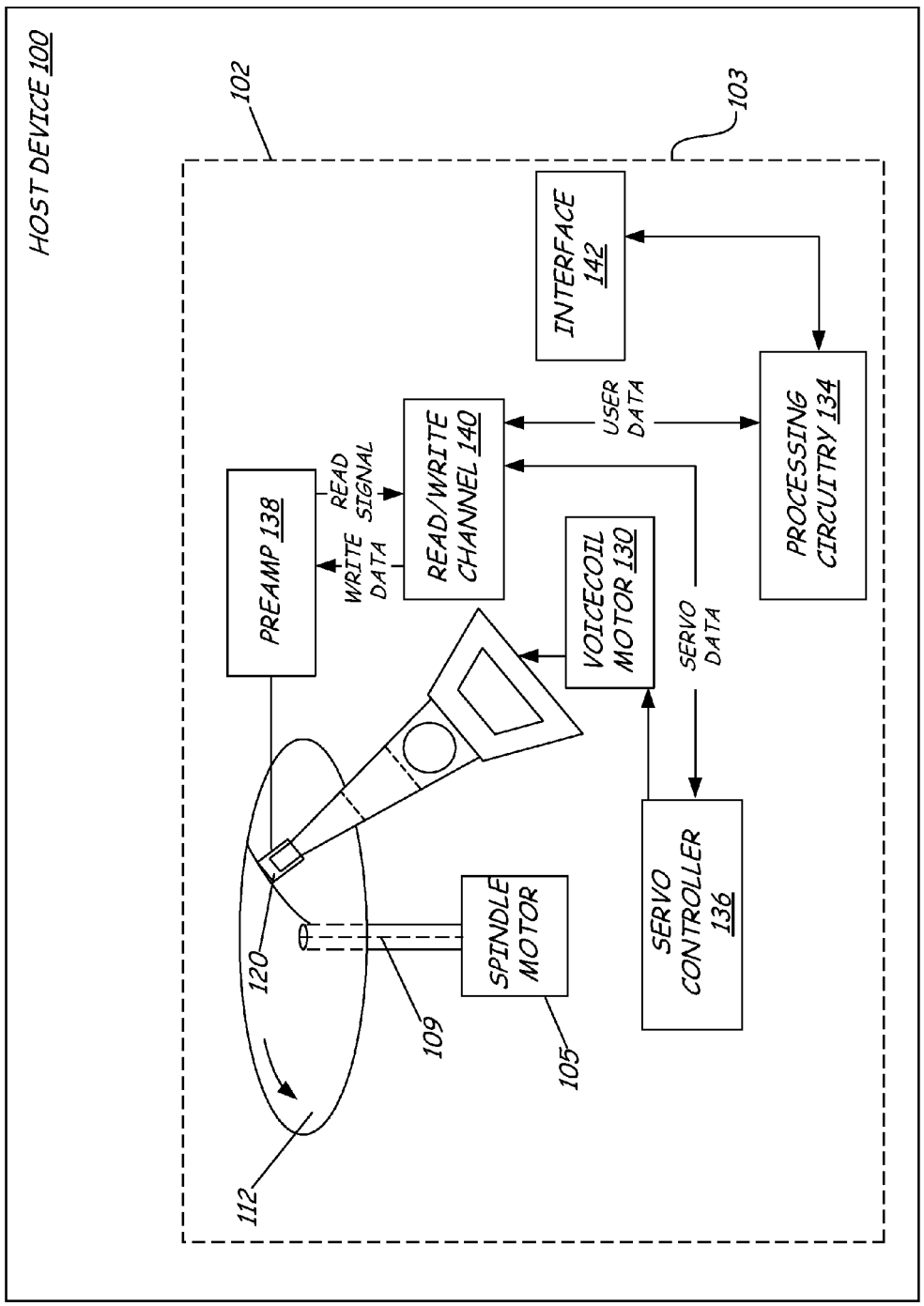
FIG. 1 is a simplified block diagram of a host device including a rotatable data storage device.

FIG. 1 is a simplified block diagram of a host device 100 having a rotatable data storage device 102. Host device 100 is an electronic portable device. Rotatable data storage device 101 includes a housing 103 that houses processing circuitry 134. The various operations of rotatable data storage device 101 are controlled by processing circuitry 134 with the use of programming stored in a memory. Rotatable data storage device 101 also includes servo controller 136 which generates control signals applied to voice coil motor (VCM) 130. Processing circuitry 134 instructs servo controller 136 to seek a transducer 120 to desired tracks of a medium or disc 112. Although rotatable data storage device 102 illustrates a single disc 112, it should be realized that the data storage device can include multiple discs. Servo controller 136 is also responsive to servo data, such as servo burst information recorded on medium or disc 112 and embedded servo fields or wedges included in data tracks. Medium or disc 112 is rotatable about a central axis 109 by a spindle motor 105.

Rotatable data storage device 101 further includes a preamplifier (preamp) 138 for generating a write signal applied to transducer 120 during a write operation, and for amplifying a read signal emanating from transducer 120 during a read operation. A read/write channel 140 receives data from processing circuitry 134 during a write operation and provides encoded write data to preamplifier 138. During a read operation, read/write channel 140 processes a read signal generated by preamp 138 in order to detect and decode data recorded on medium 112. The decoded data is provided to processing circuitry 134 and ultimately through an interface 142 to host device 100.

Figure 2:
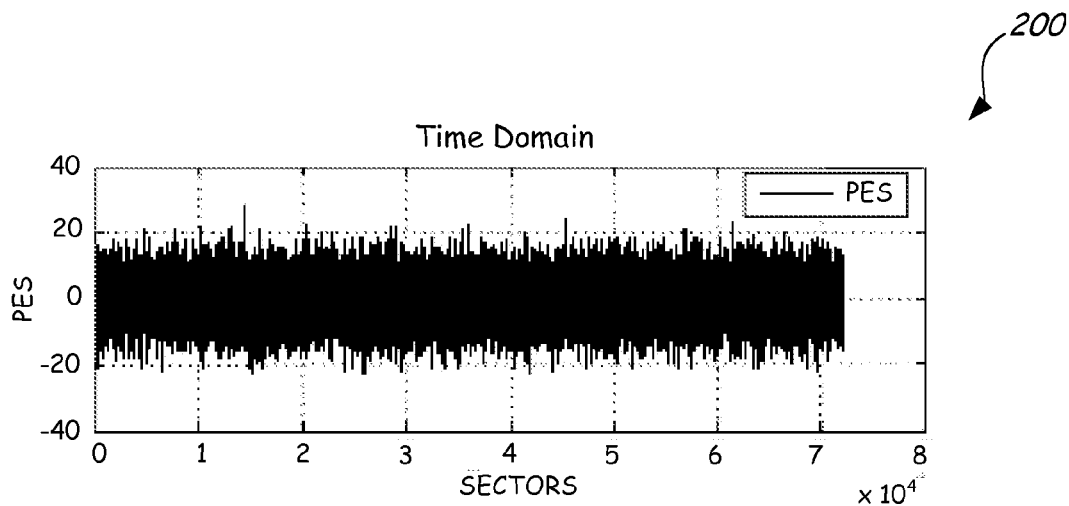
FIG. 2 illustrates a graphical representation of a position error signal sensed by a transducer and fed back to the servo controller of the rotatable data storage device illustrated in FIG. 1.
Figure 3:
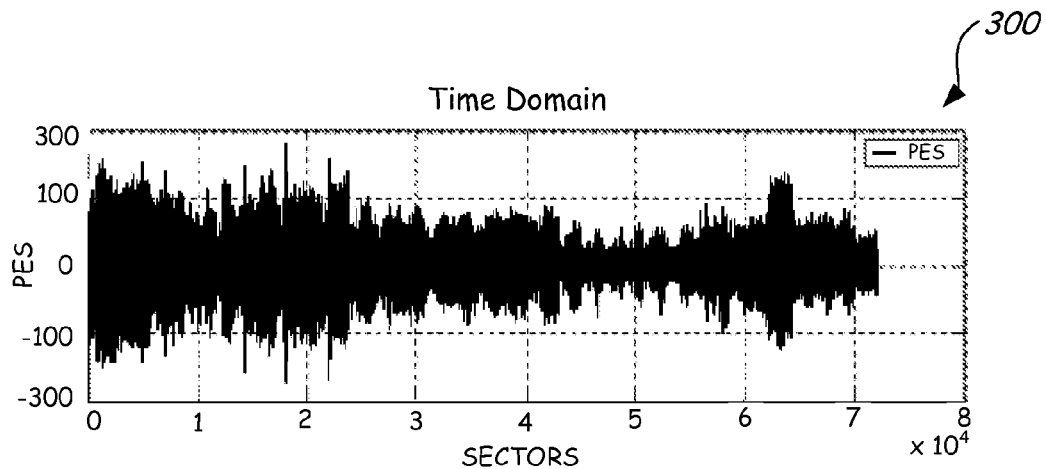
FIG. 3 is a graphical representation of a position error signal when a speaker is activated in a mobile phone, but not a vibrator.
Figure 4:
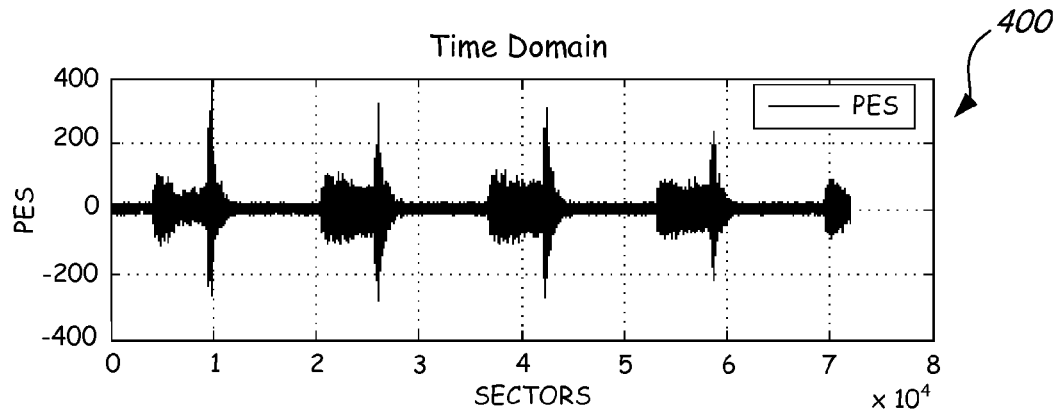
FIG. 4 is a graphical representation of a position error signal when a vibrator is activated in a mobile phone, but not a speaker.

Unlike a solid-state data storage device, rotatable data storage device 101 provides a higher storage capacity for host device 100. High data storage capacity is desirable especially for audio and video capability, which is often a feature of host device 100. However, rotatable data storage device 101 is more susceptible to failure, compared to solid-state data storage systems, due to sources of vibration or shock emanating from host device 100. In particular, two unique disturbance sources that commonly affect a portable electronic device, such as a mobile phone, include a vibrator and a speaker. In a mobile phone application, both sources or one of the sources of disturbance occur frequently to indicate an incoming phone call. When the vibrator or speaker is activated, such disturbance can cause position error of transducer 120. FIG. 2 is a graphical representation 200 of a position error signal (PES) sensed by the transducer and fed back to the servo controller 136. The PES in FIG. 2 represents the PES of a servo controller in a rotatable data storage system located in a mobile phone when neither the vibrator nor the speaker is activated. FIG. 3 is a graphical representation 300 of a PES when the speaker is activated in a mobile phone, but not the vibrator. FIG. 4 is a graphical representation 400 of a PES when the vibrator is activated in a mobile phone, but not the speaker. With reference to FIGS. 2-4, it is easily shown that a mobile phone's vibrator causes worse off-track results than that of the mobile phone's speaker. It should be understood that vibration compensation is one way in which these off-track results can be corrected.

Typically, high end rotatable data storage devices use either expensive rotational vibration sensors or linear vibration sensors that can directly sense the vibration amplitude of a shock event. The sensed vibration amplitude can be processed and injected directly into a servo controller. By injecting the vibration amplitude directly into a servo controller, vibrations from the shock event can be compensated, which can correct the position of a slider. Unfortunately, high end rotatable data storage devices are impractical for use in relatively inexpensive electronic portable devices.

Current low cost rotatable data storage devices are equipped with inexpensive shock detection circuits for the purpose of write protection. The output of these inexpensive shock detection circuits cannot be used directly in a servo controller, such as servo controller 136, for vibration compensation. Instead, the outputs of these inexpensive shock detection circuits indicate a level of amplitude. If the amplitude level exceeds a threshold level, the shock detection circuit outputs a trigger signal capable of preventing a write operation.

Typically, a vibrator in a mobile phone is a rotary motor. Vibration of the vibrator is induced through the rotation of the motor shaft attached to a metal weight. Therefore, the vibration frequency of the vibrator is directly related to the motor speed. The vibration frequency waveform of the vibrator can be divided into three phases. In the first phase, the motor speed begins to pick up and, thus, vibration frequency increases. In the second phase, the motor spins at a constant speed and, thus, the vibration frequency is fixed. In the third phase, the motor speed drops and, thus, vibration frequency decreases.

As illustrated in FIG. 4, there is a large PES off-track result during vibration of a vibrator in a mobile phone. Such a large PES affects read/write data throughput during the vibration. Besides the inexpensive shock detection circuits of rotatable data storage devices in electronic portable devices being unable to identify vibration frequency for vibration compensation, the variation in phase to phase vibration frequency as well as the variation in vibrator type for each mobile phone drives the need for vibration frequency identification in real-time for use in vibration compensation.

Figure 5:
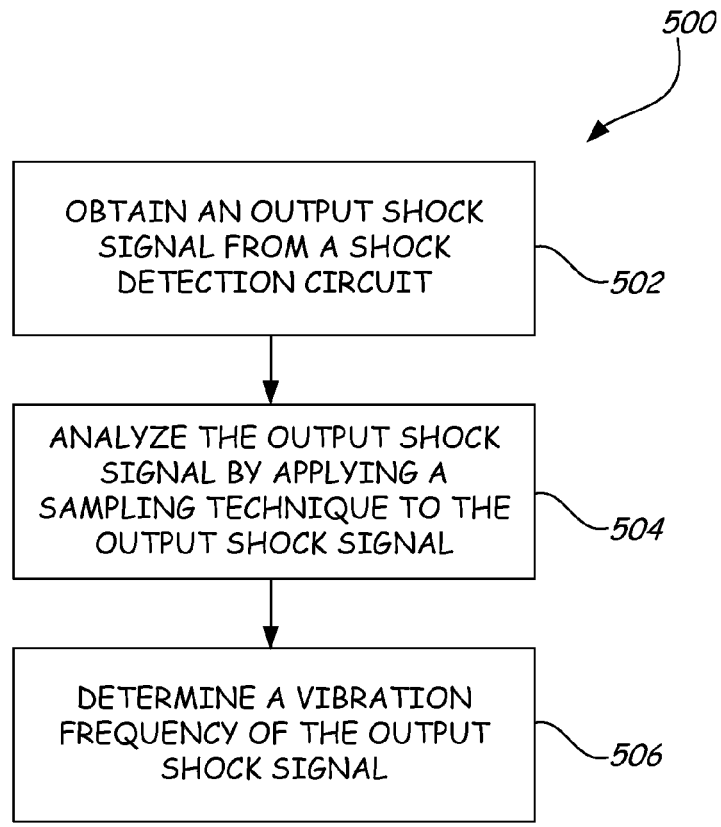
FIG. 5 is a flowchart illustrating a method of identifying vibration frequency in an electronic portable device under one embodiment.
Figure 6:
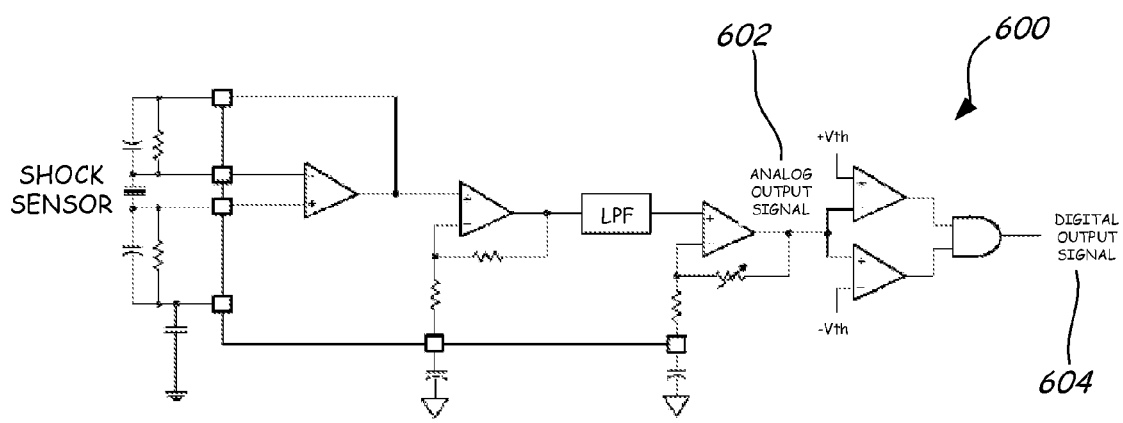
FIG. 6 is an example schematic illustration of a shock detection circuit.

FIG. 5 is a flowchart 500 illustrating a method of identifying vibration frequency of an electronic portable device. At block 502, an output shock signal is obtained from a shock detection circuit capable of determining if a vibration exceeds a level of vibration amplitude and incapable of detecting a vibration frequency. FIG. 6 illustrates an example shock detection circuit 600. Example shock detection circuit 600 can output a signal that indicates a level of amplitude. The level of amplitude is used to prevent a write operation if an amplitude level exceeds a threshold value. Shock detection circuit 600 is unable to detect a vibration frequency.

Figure 7:
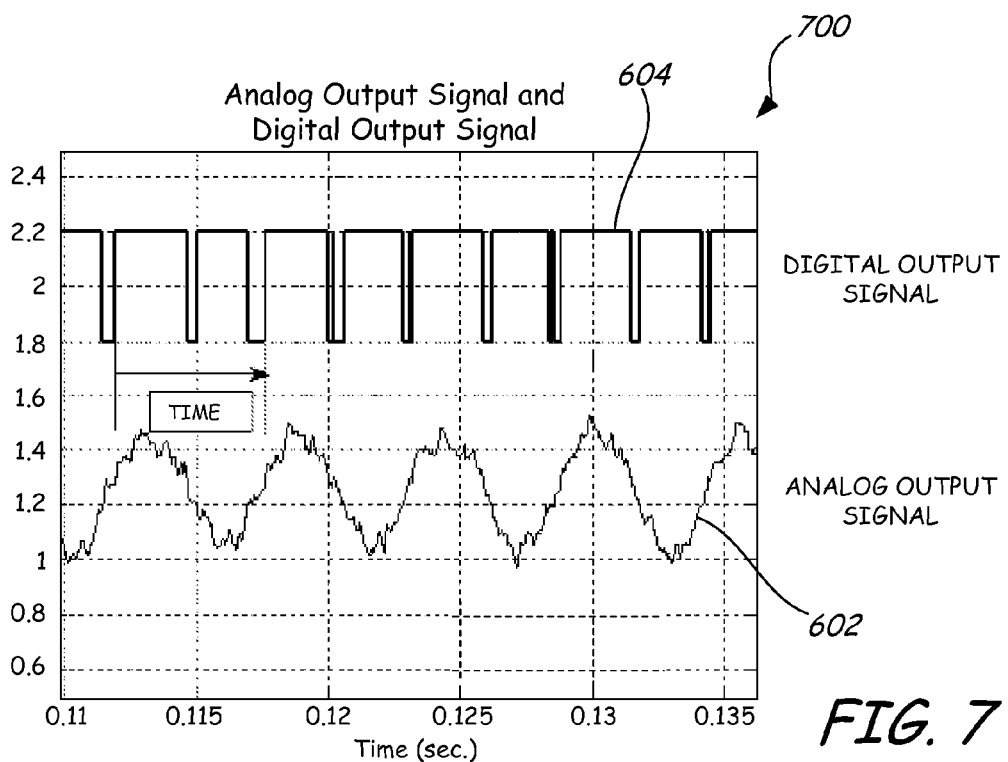
FIG. 7 illustrates a graphical representation of an analog output signal and a digital output signal from the shock detection circuit illustrated in FIG. 6.

In a shock detection circuit that is capable of determining if a vibration exceeds a level of vibration amplitude and is incapable of detecting a vibration frequency, a shock sensor signal will go through various amplifiers and filters to yield an analog output shock signal 602 as indicated in FIG. 6 and in graphical representation 700 of FIG. 7. The analog output shock signal 602 is then compared with a predetermined threshold. If the analog output signal exceeds the predetermined threshold, then a digital output shock signal 604, as indicated in FIG. 6 and in graphical representation 700 of FIG. 7, will trigger the prevention of a write operation. It should be noted that the frequency of the digital output shock signal 604 reflects the frequency of the analog output signal 602. In particular and as illustrated in FIG. 7, a change in time of alternate rising edges of the digital output signal 604 are equal to a period of the analog output signal 602.

At block 502 and in one embodiment, the output shock signal obtained to identify vibration frequency can be the digital output signal 604. The digital output signal 604 is obtained by comparing an analog output shock signal to a predetermined threshold value as indicated in block 802 of a flowchart 800 that illustrates one embodiment of identifying vibration frequency of an electronic portable device. At block 502 and in another embodiment, the output shock signal obtained can be the analog output signal 602 as indicated in block 902 of a flowchart 900 illustrating another embodiment of identifying vibration frequency of an electronic portable device.

Figure 8:
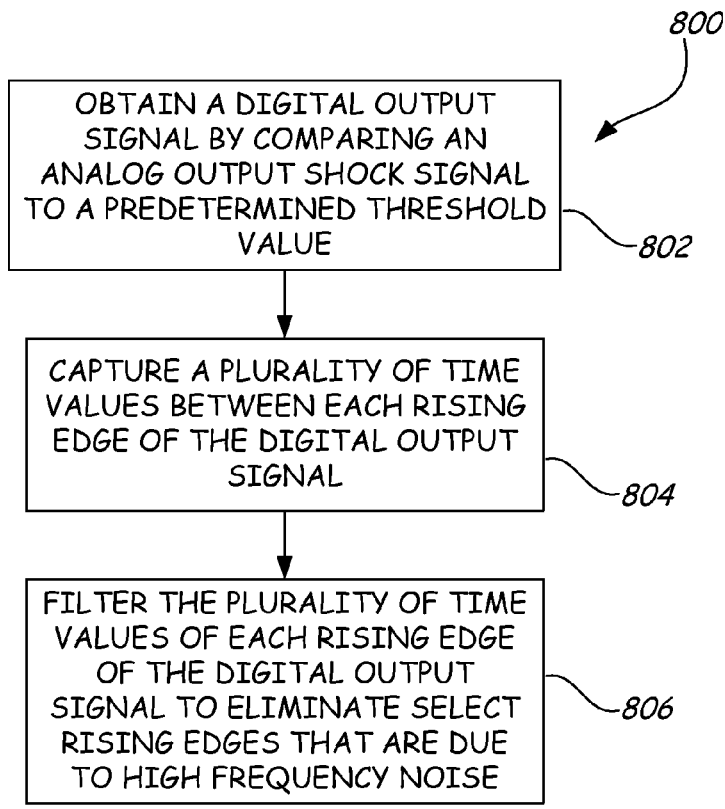
FIG. 8 is a flowchart illustrating a method of identifying vibration frequency in an electronic portable device under one embodiment.
Figure 10:
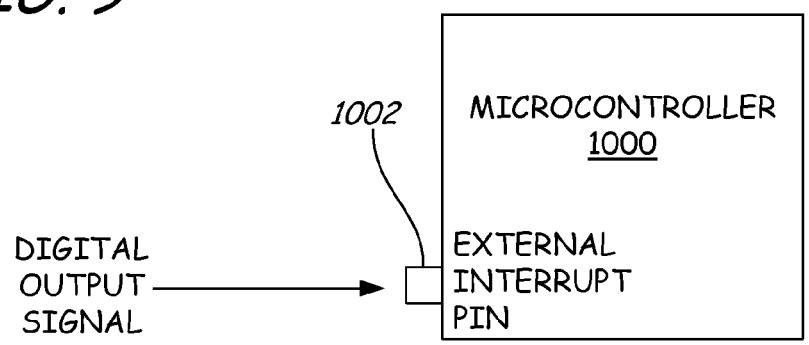
FIG. 10 is a schematic illustration of a microcontroller under one embodiment.
Figures 1, 11:
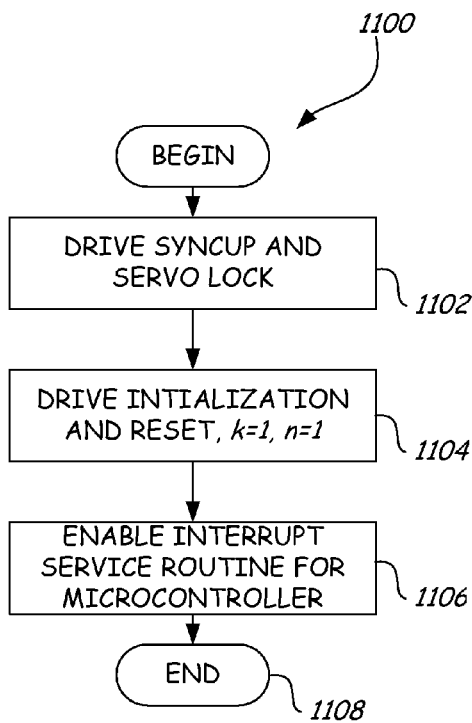
FIG. 11 is a flowchart illustrating a method of analyzing a digital output signal from the shock detection circuit in FIG. 6 to identify a vibration frequency of an electronic portable device under one embodiment.
Figures 2, 11:
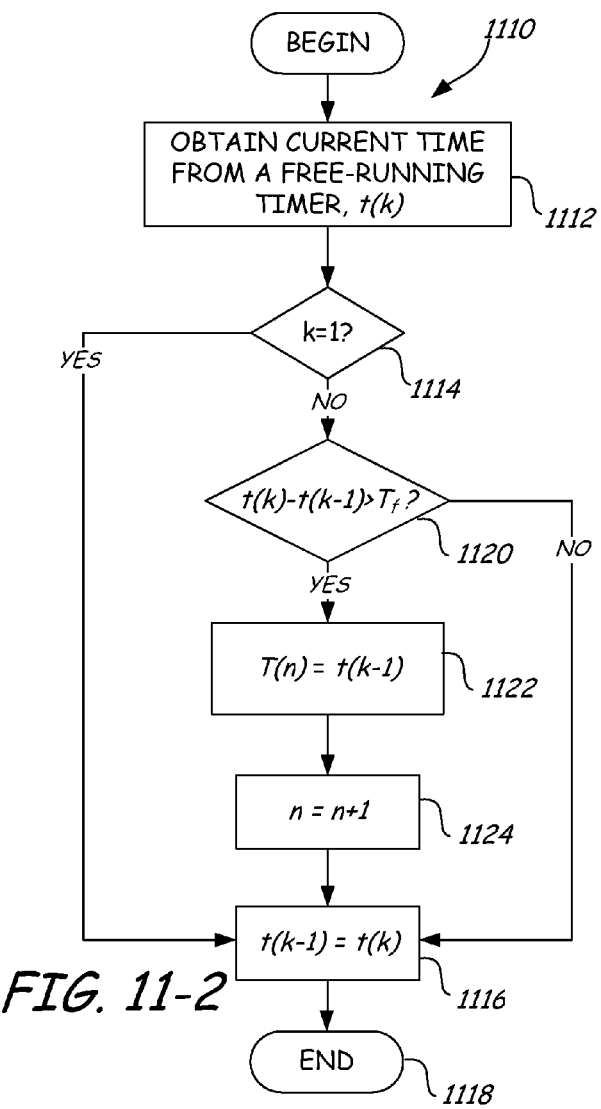

At block 504, a sampling technique is applied to the output shock signal for analysis. In one embodiment and as indicated in blocks 804 and 806 of FIG. 8, a plurality of time values between each rising edge of digital output signal 604 are captured and then the plurality of time values of each rising edge of the digital output signal are filtered to eliminate select rising edges that are due to high frequency noise. To analyze the digital output signal as indicated in blocks 804 and 806, a microcontroller 1000 is utilized as illustrated schematically in FIG. 10. Microcontroller 1000 is mounted on a PCBA board in a rotatable data storage device and includes an external interrupt pin 1002 of which the digital output signal is coupled to. Microcontroller 1000 runs an interrupt service routine on the digital output signal coupled to external interrupt pin 1002. FIGS. 11-1 and 11-2 illustrate flowcharts 1100 and 1110 of such a routine.

As previously discussed, the presence of high frequency noise causes the digital output signal 604 to have more rising edges than the actual amount of correct rising edges due to vibrational shock. Since vibration frequency induced by a vibrator in a mobile phone is generally lower than 300 Hz, it can be realized that the correct change in time between two rising edges of vibration frequency should be more than a predetermined time $T_f$. Predetermined time $T_f$ can be used in the interrupt service routine to filter out rising edges caused by high frequency noise.

In flowchart 1100 of FIG. 11-1, initialization of a microcontroller, such as microcontroller 1000, is completed. At block 1102, a rotatable data storage device, such as device 100 (FIG. 1), is synced and a servo controller, such as servo controller 136 (FIG. 1) is locked. At block 1104, a time capture buffer is reset such that a rising edge k is set to 1 and the time of a correct rising edge due to vibrational shock is set to 1. At block 1106, the interrupt service routine is enabled. At block 1108, initialization is complete.

In flowchart 1110 of FIG. 11-2, entry into the interrupt service routine is accomplished as the interrupt service routine comes across a rising edge. At block 1112, current time from a free running timer is obtained. The current time is denoted by t(k), or in this case t(1), upon entry into the routine after initialization. At decision block 1114, it is determined whether the rising edge k is equal to 1. If k is equal to 1, as is the case when the interrupt service routine has just been initialized, then the routine proceeds to block 1116 where the current time t(k) is set as the previous time t(k−1). At block 1118 the interrupt service routine ends. Upon coming across another rising edge, the interrupt service routine is repeated at block 1112 where the rising edge k is now equal to 2. At block 1112, the current time is obtained and denoted as, in this case, t(2). At block 1114, it is determined whether the rising edge k is equal to 1. If k is not equal to 1, as is the case upon interrupt service routine coming across another rising edge, then the routine proceeds to decision block 1120.

At decision block 1120, it is determined whether by subtracting the previous time t(k−1), in this instance t(1), from the current time t(k), in this instance t(2), is greater than a predetermined time $T_f$. If the current time t(k) less the previous time t(k−1) is not greater than predetermined time $T_f$ then the routine proceeds to block 1016 where the current time t(k) is set as the previous time t(k−1) and then proceeds to block 1118 where the interrupt service routine ends. If the current time t(k) less the previous time t(k−1) is greater than predetermined time $T_f$ then the routine proceeds to block 1122. At block 1122, the timing capture buffer or vibration frequency T(n) is set equal to the previous rising edge t(k−1).

Figure 12:
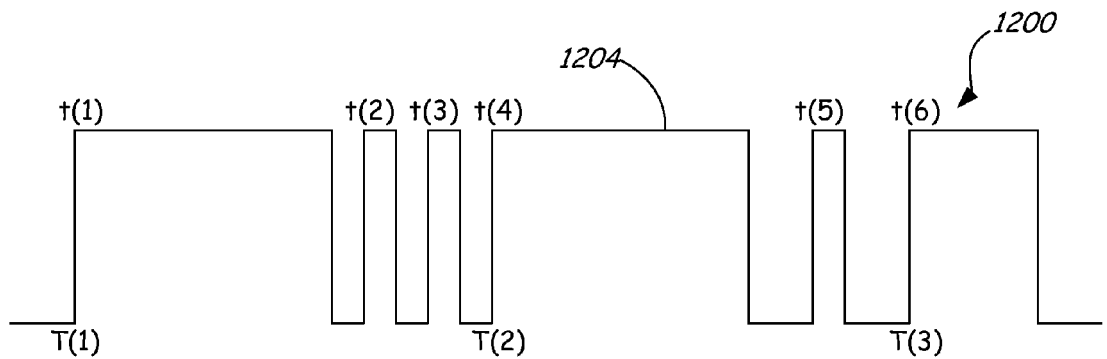
FIG. 12 is a graphical representation of an example digital output signal.

An example graphical representation 1200 of a digital output signal 1204 is illustrated in FIG. 12. As illustrated in FIG. 12, it can be seen that t(1), t(2), t(3), t(4), t(5), t(6), . . . , t(k) are the rising edges of digital output signal 1204, while the actual vibration frequency or timing capture buffer is determined by T(1), T(2), T(3), . . . , T(n). In regards to block 1122 of FIG. 11-2, the subtraction of the previous time t(1) from the current time t(2) is greater than the predetermined time $T_f$ so T(1) is equal to t(1) as illustrated in graphical representation 1200 of FIG. 12. At block 1124, the sequential number indicating the next actual rising edge due to vibration frequency is increased. At block 1116, the current time t(k) is set as the previous time t(k−1) and the routine proceeds to block 1118 where the interrupt service routing ends. Entry into the interrupt service routine is repeated when coming across another rising edge. In FIG. 12, it is shown that example digital output signal 1204 includes a t(3)−t(2) that is less than the predetermined time $T_f$ and a t(4)−t(3) that is less than the predetermined time $T_f$. Therefore, both t(2) and t(3) are discarded (i.e., they are not rising edges due to vibration). However, a t(5)−t(4) is greater than the predetermined time $T_f$, so T(2)=t(4) or the rising edge associated with t(4) is a rising edge due to vibration. The rising edges T(1), T(2), . . . , T(n) are used to determine the vibration frequency of the output shock signal as illustrated in block 506 in FIG. 5. Identification of the vibration frequency can be used to compensate for external shock experience by the head of the rotatable storage device.

Figure 9:
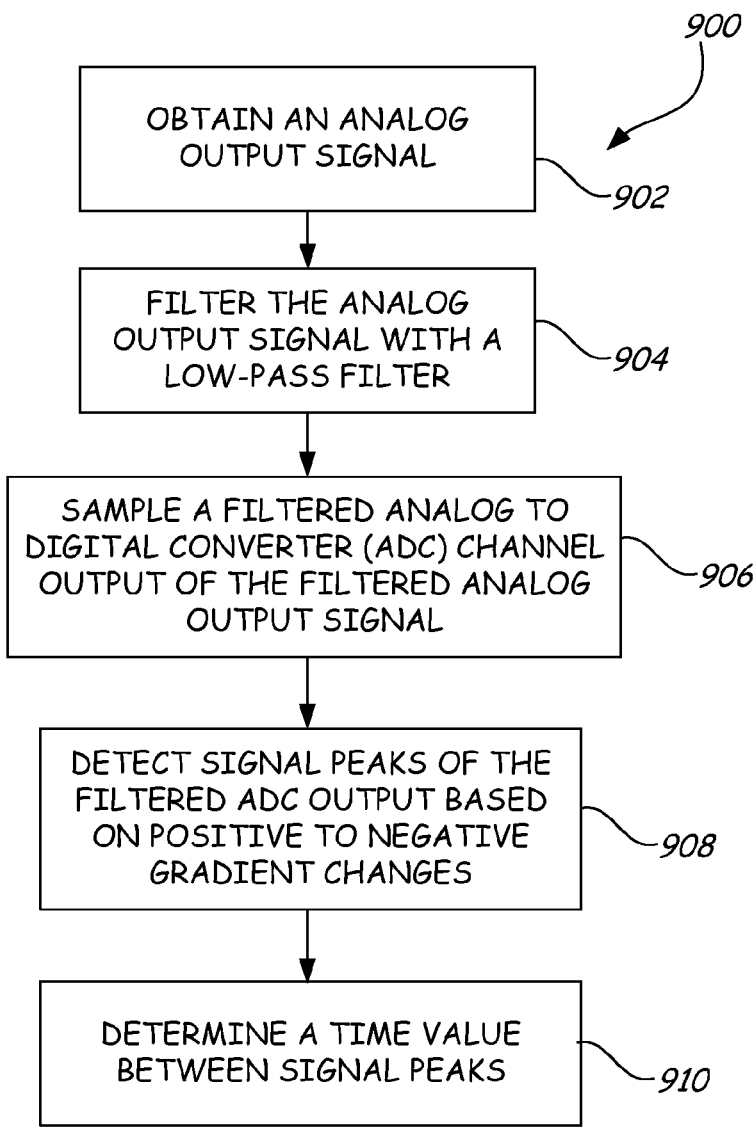
FIG. 9 is a flowchart illustrating a method of identifying vibration frequency in an electronic portable device under one embodiment.
Figure 13:
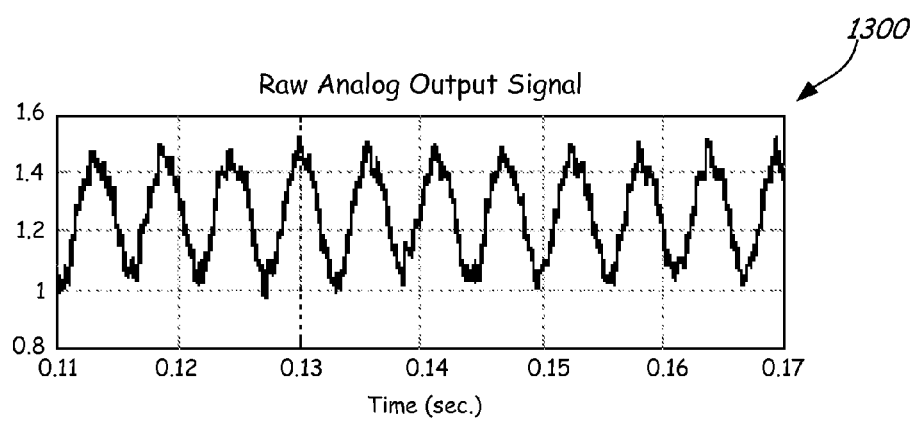
FIG. 13 is a graphical representation of a raw analog output signal from the shock detection circuit in FIG. 6.
Figure 14:
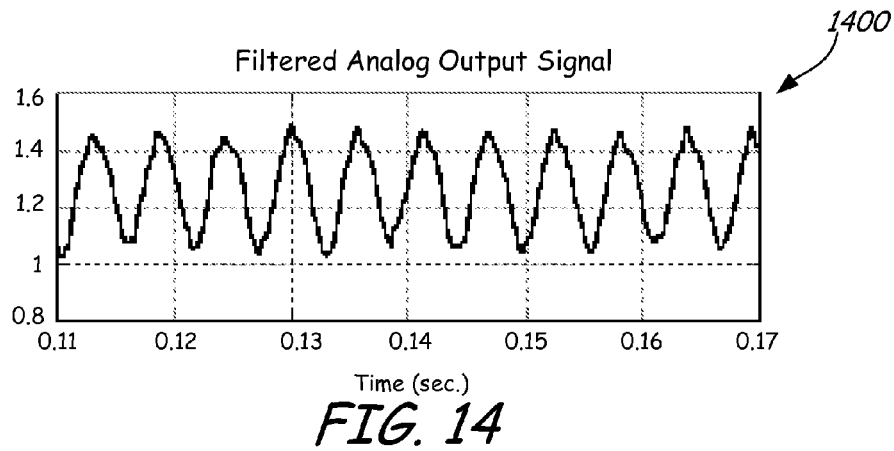
FIG. 14 is a graphical representation of a filtered analog output signal from the shock detection circuit in FIG. 6.
Figure 15:
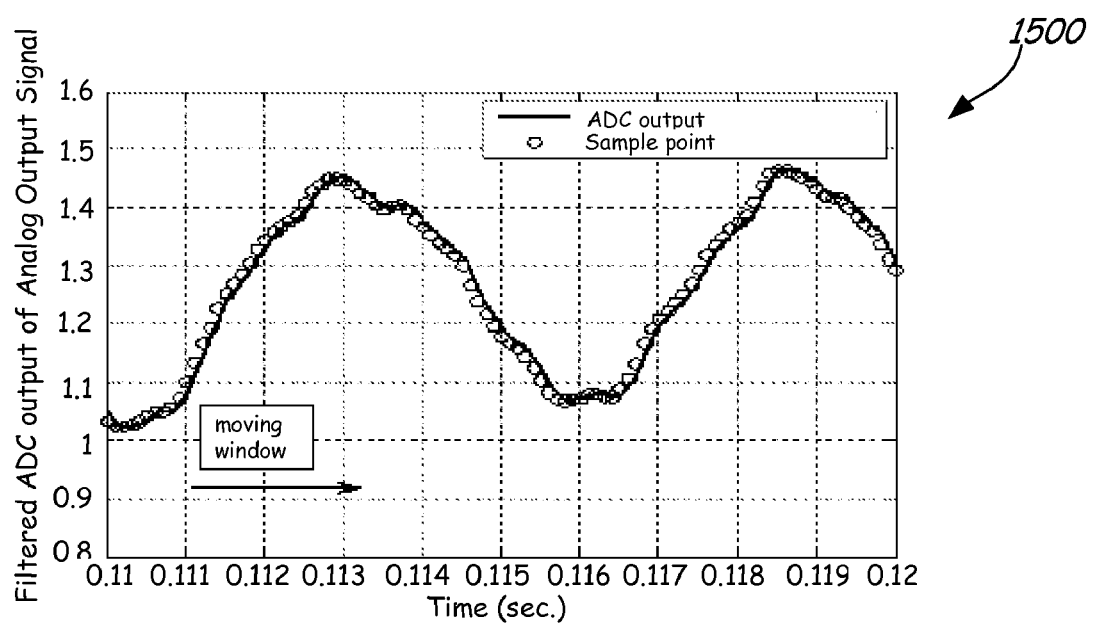
FIG. 15 is a graphical representation of a filtered analog to digital converter channel output of the analog output signal from the shock detection circuit in FIG. 6.

Referring back to FIGS. 5 and 9, in another embodiment of block 504, the analog output signal obtained in block 902 of FIG. 9 can be used to identify vibration frequency. The analog output signal can be filtered with a low-pass filter as indicated in block 904, an analog to digital converter (ADC) channel output of the analog output signal can be sampled as indicated in block 906, signal peaks of the filtered ADC output can be detected based on positive to negative gradient changes as indicated in block 908 and a time value between signal peaks can be determined at block 910. FIG. 13 illustrates a graphical representation 1300 of the raw analog output signal obtained in block 902 of FIG. 9. FIG. 14 illustrates a graphical representation 1400 of the analog output signal as filtered in block 904. FIG. 15 illustrates a graphical representation 1500 of a filtered ADC channel output of the filtered analog output signal as sampled.

Figure 16:
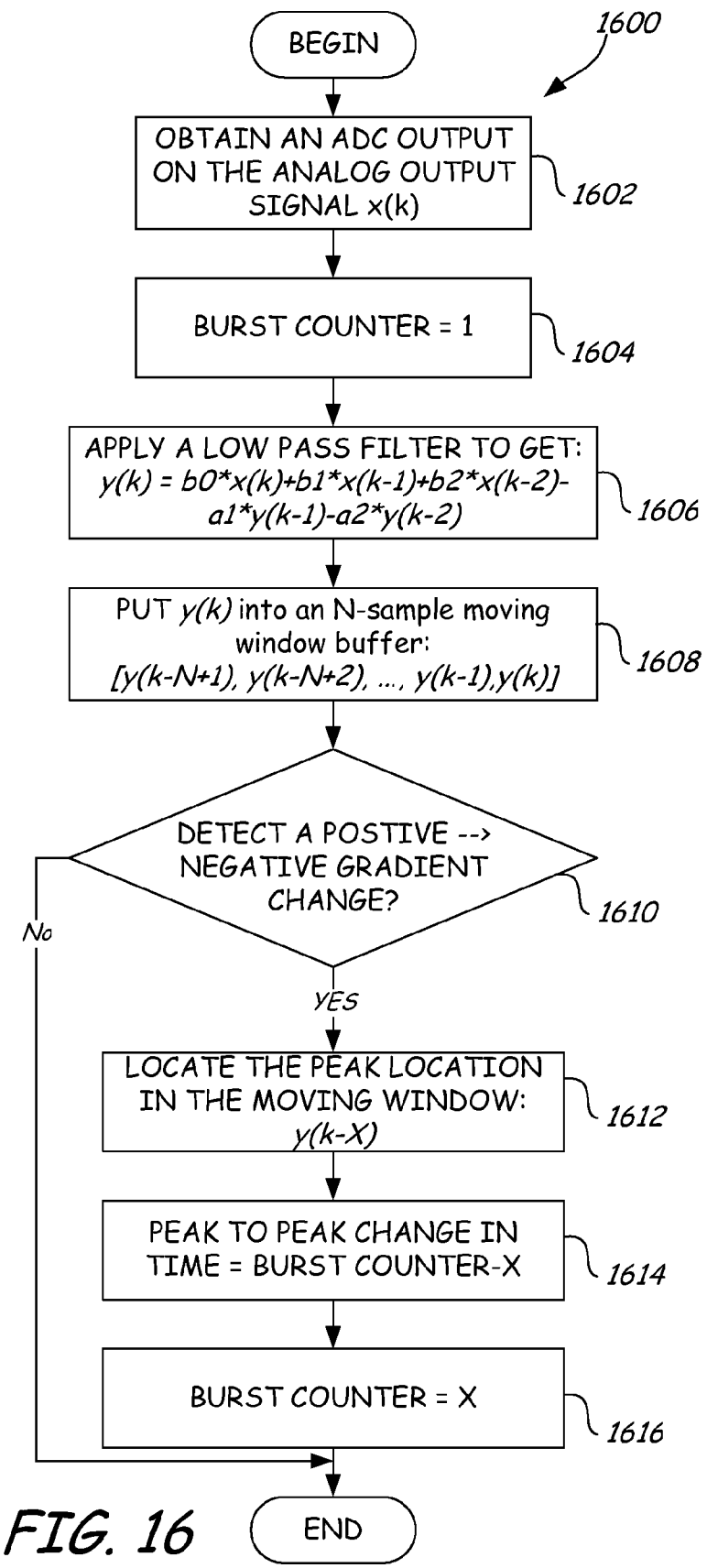
FIG. 16 is a flowchart illustrating a method of analyzing an analog output signal from the shock detection circuit in FIG. 6 to identify a vibration frequency of an electronic portable device under one embodiment.

To analyze the obtained analog output signal as illustrated in blocks 904, 906 and 908, an interrupt service routine is run on the signal. Flowchart 1600 illustrated in FIG. 16 illustrates such a routine. At block 1602, an ADC channel output x(k) of the analog output signal is obtained. At block 1604, a burst counter is set to 1. At block 1606, a low pass filter is applied to the ADC channel output to retrieve a filtered ADC channel output [y(k)=b0*x(k)+b1*x(k−1)+b2*x(k−2)−a1*y(k−1)−a2*y(k−2)]. The filtered ADC channel output is then put into an N-sample moving window buffer as denoted by y(k−N+1), y(k−N+2), ..., y(k−1), y(k) at block 1608. At block 1610, it is determined whether the gradient changes are from positive to negative inside the moving window buffer. If a positive to negative gradient change is detected, then the peak location in the moving window y(k−X) is located at block 1612. At block 1614, a peak to peak change in time is determined based on a change of time from the location of the gradient change X from the burst counter. At block 1616, the burst counter is set to the location of the current gradient change X. If no positive to negative gradient change is detected, the routine proceeds to exit the interrupt service routine until the next burst interrupt. The peak to peak change in time is used to determine the vibration frequency of the output shock signal as illustrated in block 506 in FIG. 5. Identification of the vibration frequency can be used to compensate for external shock experienced by the head of the rotatable storage device.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matter of structure and arrangement of parts within the principles of the present invention to the full extent indicated by the broad general meaning of the terms in which the appended claims are expressed. For example, the particular elements may vary depending on the particular application for a rotatable data storage device while maintaining substantially the same functionality without departing from the scope of the present invention. In addition, although the embodiments described herein are directed to a rotatable data storage device, it will be appreciated by those skilled in the art that the embodiment of the disclosure can be applied other types of data storage devices that have similar vibration issues, without departing from the scope of the invention.

What is claimed is:

1. A method comprising:
    obtaining an output shock signal from a shock detection circuit, wherein the output shock signal is indicative of vibration amplitude;
    analyzing the output shock signal by applying a sampling technique to the output shock signal, the sampling technique including comparing the output shock signal to a predetermined threshold value to obtain a digital output shock signal; and
    identifying a vibration frequency of the output shock signal based on the analyzed output shock signal, the identified vibration frequency configured for use in vibration compensation.

2. The method of claim 1, wherein analyzing the output shock signal by applying the sampling technique to the output shock signal further comprises:
    capturing a plurality of time values between each rising edge of the digital output signal.

3. The method of claim 1, wherein analyzing the output shock signal by applying the sampling technique to the output shock signal further comprises:
    filtering the plurality of time values of each rising edge of the digital output signal to eliminate select time values between each rising edge of the digital output signal that are due to high frequency noise.

4. A method comprising:
    obtaining an output signal from a shock detection circuit, wherein the output signal is indicative of vibration amplitude;
    identifying a vibration frequency of the vibration based on the output signal including sampling a filtered analog to digital converter (ADC) channel output of a filtered analog output shock signal and detecting signal peaks of the filtered ADC channel output based on positive to negative gradient changes; and
    compensating vibration in an electronic component using the identified vibration frequency.

5. The method of claim 4, wherein identifying the vibration frequency of the vibration signal from the shock detection circuit further comprises:
    determining a time value between signal peaks.

6. The method of claim 4, wherein the vibration identified comprises one of a ring-tone vibration frequency and a vibrator alert vibration frequency.

7. An electronic component comprising:
    a shock detection circuit configured to output an output signal, the output signal indicative of vibration amplitude;
    a first controller configured to receive the output signal and to identify a vibration frequency of the vibration based on the output signal by capturing a plurality of time values between each rising edge of the output shock signal; and
    a second controller configured to receive the identified vibration frequency of the vibration and to compensate the vibration.

8. The electronic component of claim 7, wherein the first controller is further configured to:
    filter the plurality of time values of each rising edge of the output signal to eliminate select time values between each rising edge of the output signal that are due to high frequency noise.

9. The electronic component of claim 7, wherein the servo controller is configured to process the identified vibration frequency directly into a servo control loop.

10. An electronic component comprising:
    a shock detection circuit configured to output an output signal, the output signal indicative of vibration amplitude;
    a first controller configured to receive the output signal and to identify a vibration frequency of the vibration based on the output signal by detecting signal peaks of a filtered output shock signal based on positive to negative gradient changes; and
    a second controller configured to receive the identified vibration frequency of the vibration and to compensate the vibration.

11. The electronic component of claim 10, wherein the first controller is further configured to:
    determine a time value between signal peaks.

12. The electronic component of claim 11, wherein the first controller is further configured to:
    filter the output shock signal with an analog to digital converter channel to obtain the filtered output shock signal.

* * * * *